United States Patent [19]

Olson

[11] Patent Number: 4,968,247

[45] Date of Patent: Nov. 6, 1990

[54] CAM OPERATED CLAMP HOUSING FOR INJECTION MOLDING HEATERS

[75] Inventor: Charles W. Olson, Bloomington, Minn.

[73] Assignee: Rosemount Inc., Eden Prairie, Minn.

[21] Appl. No.: 452,258

[22] Filed: Dec. 18, 1989

[51] Int. Cl.[5] .......... F24J 3/00; H05B 3/06; B65D 63/00

[52] U.S. Cl. .......... 432/225; 432/226; 432/227; 24/19; 24/268; 24/269; 24/483; 24/484; 219/535; 219/536

[58] Field of Search .......... 432/225, 228, 226, 227, 432/229, 231, 183, 184, 10; 24/19, 20, 24, 25, 268, 269, 483, 484; 219/535, 536

[56] References Cited

U.S. PATENT DOCUMENTS

| | | | |
|---|---|---|---|
| D. 173,118 | 2/1876 | Gilman | 24/24 |
| 565,698 | 8/1896 | Sparks | 24/25 |
| 1,849,532 | 2/1931 | McDevitt | 24/19 X |
| 3,916,507 | 11/1975 | McGrath | 24/25 X |
| 4,131,788 | 12/1978 | Fulbrook | 24/19 X |
| 4,292,503 | 9/1981 | Brent | 219/536 X |
| 4,438,325 | 3/1984 | Gellert | 219/536 |
| 4,515,562 | 5/1985 | Williams | 432/225 |
| 4,563,795 | 1/1986 | Fournier | 24/19 |
| 4,859,176 | 8/1989 | Meyer | 432/225 |

*Primary Examiner*—Henry A. Bennet
*Assistant Examiner*—C. Kilner
*Attorney, Agent, or Firm*—Kinney and Lange

[57] ABSTRACT

A clamp housing for cylindrically wound heaters, particularly for an injection molding nozzle heater has a slit that permits changing the effective diameter of the housing and it is actuated by an axially extending cam pin that can be easily adjusted from an exposed end of the heater. The cam pin has a central cam portion formed between two end hubs that are rotatably mounted with respect to one edge of a longitudinal slit in the clamp housing, and a central cam portion that is mounted in a loop formed from the opposite edge of the slit in the housing. As the cam pin is rotated the two edges of the slit in the housing can be forced together because of the cam action and the housing will tighten around a heater held on the interior of the clamp.

6 Claims, 2 Drawing Sheets

CAM OPERATED CLAMP HOUSING FOR INJECTION MOLDING HEATERS

BACKGROUND OF THE INVENTION

The present invention relates to a clamp for an injection molding heater that simply and easily provides clamping force to clamp a heater onto a cylindrical nozzle for heating the nozzle.

Nozzle heaters for injection molds are helically wound around the nozzles. The nozzles are recessed into cavities, and access for tightening the heaters onto the nozzle is restricted. The ability to adjust the heater clamping force from the open end of the recess is desired, and one form of accomplishing this is shown in U.S. Pat. No. 4,859,176. The clamp in U.S. Pat. No. 4,859,176 is a multi part device and thus can be difficult to assemble.

SUMMARY OF THE INVENTION

The present invention relates to a very simple clamp for a heater used with injection nozzles, or other cylindrical objects or heaters, which utilizes a formed, generally cylindrical housing which has a slit or slot along a longitudinal line. A pair of journals are formed on one side of the slit for rotatably mounting a cam pin, while the other side of the slit has a loop that fits over a cam portion in the center of the pin. The pin has a recessed socket hex end for use with a key or wrench that is accessible in axial direction of the heater. The assembly is relatively easy to make, and once in place the cam pin can be rotated for increasing or decreasing the clamping force. Friction on the cam parts will hold the cam locked in place.

The outer housing is very easily formed, and can be stamped out of a single piece of metal. The cam pin journals and cam follower loop are formed integrally with the housing. A heater can be placed inside the housing and then slipped over the nozzle from its accessible end. Thereafter the cam pin can be operated to tightly clamp the heater housing onto the helically wound heater, which tightens the heater against the nozzle for efficient conduction of heat to the nozzle.

DETAILED DESCRIPTION OF THE PREFERRED EMBODIMENT

Figure 1:
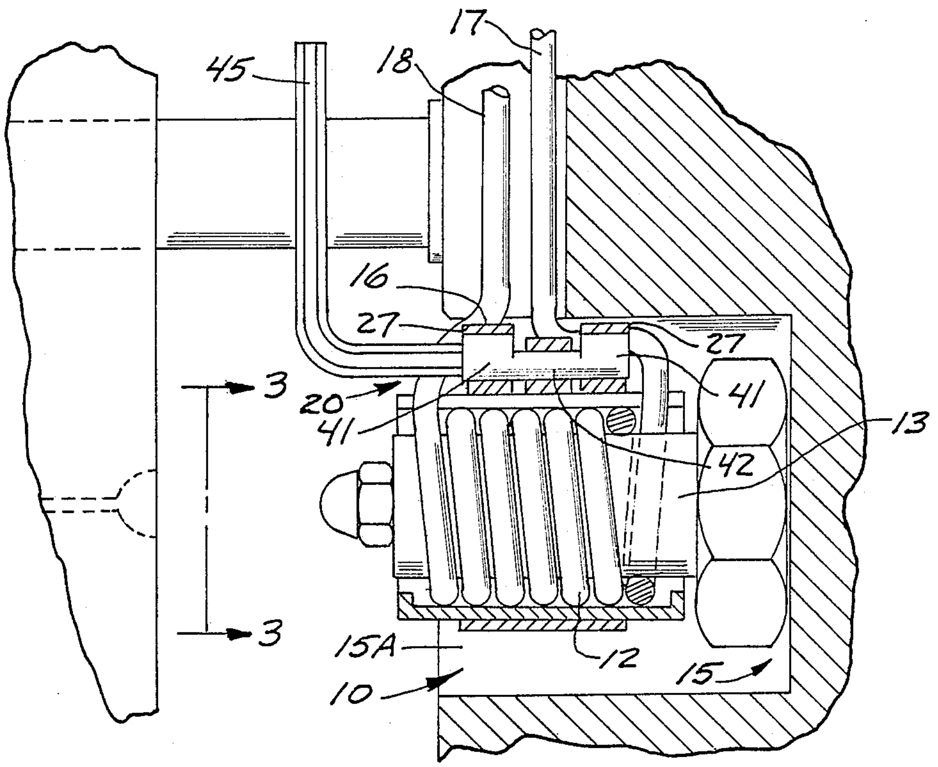
FIG. 1 is a side elevational view of a heater clamp housing made according to the present invention shown in place on an injection nozzle, with parts in section and parts broken away.

A heater clamp indicated generally at 10 includes a clamp housing 11 which surrounds a heater element 12. The heater element 12 is a helically wound heater pad which surrounds barrel or nozzle 13 that is part of a molding assembly indicated generally at 15. The heater is positioned in a recess 15A. The clamp housing 11 is a formed housing preferably made from a stainless steel sheet, and is of size in relation to the outside diameter of the heater so that when it is in its cylindrical shape there is a slit 16 that extends longitudinally with respect to the central axis of the helically wound heater 12. The heater 12 has leads or extensions 17 and 18 extending from the opposite ends thereof. As can be seen the lead 17 is formed to extend toward the open end of recess 15A and is shaped to clear a clamp cam operator indicated generally at 20 which is provided in the central portions of the housing 11 and is designed so that it will permit clamping the interior surface of housing 11 tightly against the helically wound heater 13 by providing a force tending to reduce the width of the slit 16 and thus reduce the diameter of housing 11.

Figure 8:
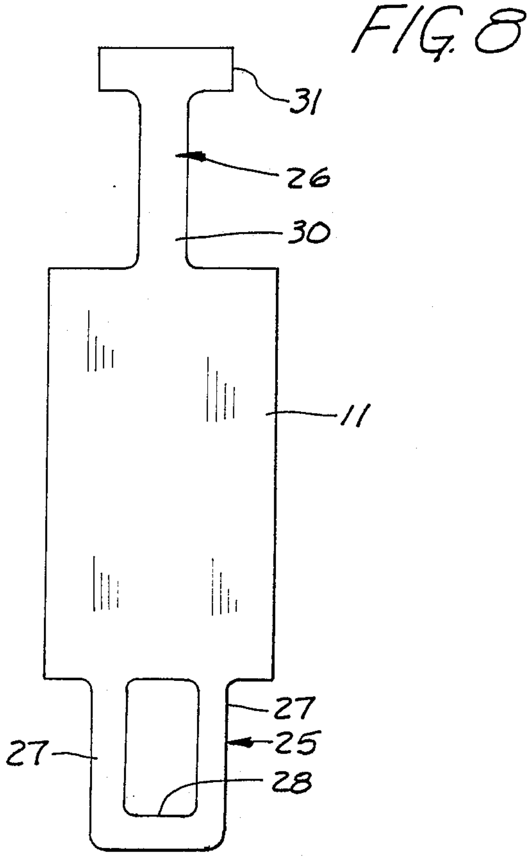
FIG. 8 is a flat layout of the housing before forming it into its clamp shape.

The housing 11 itself is formed from a flat sheet, as seen in FIG. 8, and is formed (as shown) with an integral U shaped member 25 at one edge thereof, and an integral T shaped member 26 at the other edge. The U shaped member 25 has a pair of straps 27,27 which are spaced apart, and a connecting end member 28 that joins the straps 27. The T shaped member has a central cam follower web 30, and a T end 31 at the outer end thereof.

Figure 2:
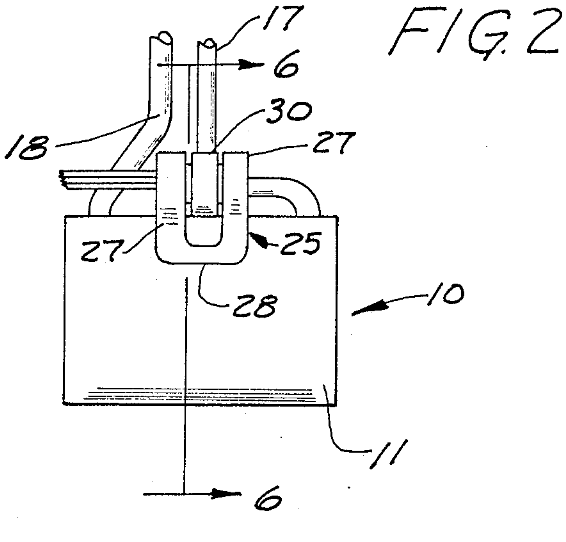
FIG. 2 is a side elevational view of the clamp housing.

When the housing 11 is formed, the main portion is formed into a cylindrical shape while leaving the slit 16 between the edges of the sheet. The U shaped portion 25 is rolled or formed in an opposite direction from the cylindrical forming, so that the end member 28 is doubled back onto the adjacent edge portion of the housing, with the straps 27 being formed into cylindrical journals. The end member 28 is formed down against the outer surface of the cylindrical housing 11 and is tack welded in place, as perhaps best shown in FIGS. 2,3 and 4.

Figure 3:
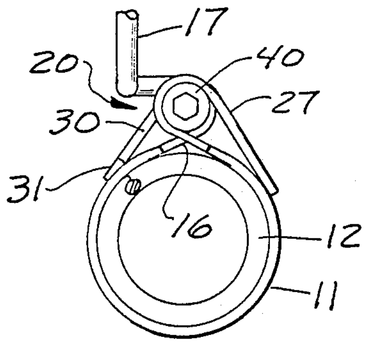
FIG. 3 is an end elevational view of the clamp housing as taken on line 3—3 in FIG. 1.
Figure 4:
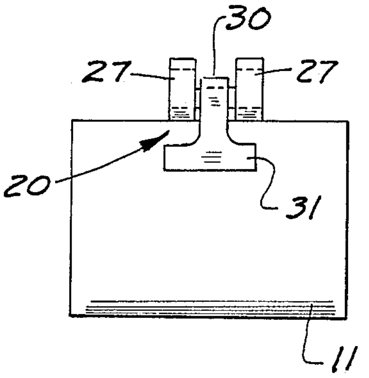
FIG. 4 is a side elevational view from an opposite side of FIG. 2.

The T shaped member 26 is also formed back in an opposite direction from the cylindrical forming of the main portion of the housing 11 and the center cam follower web 30 is formed to be of size specifically to tighten onto a cam portion of a pin 40 that is used for adjusting the clamping action of housing 11. The T end 31 is then tack welded down onto the outer surface of the housing as shown in FIGS. 3, 4 and 5, respectively.

The cam follower web 30 formed from the member 26 fits in between the straps 27, and the bores formed in the web 30 and straps 27 overlap. The straps 27 form journals for rotatably mounting cam pin 40. The cam pin 40 has hub ends 41,41 that are of size to fit into the journals formed by the straps 27 and rotate therein. The cam loop formed by web 30 fits over a cam center portion 42 of the pin 40. The cam portion 42 is between the hubs 41. The cam portion 42 is formed by making a recess in the pin center portions between the hubs 41.

Figure 5:
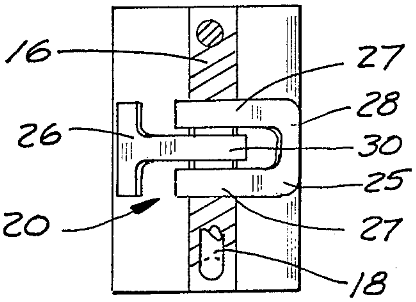
FIG. 5 is a top plan view of the heater clamp housing.
Figure 6:
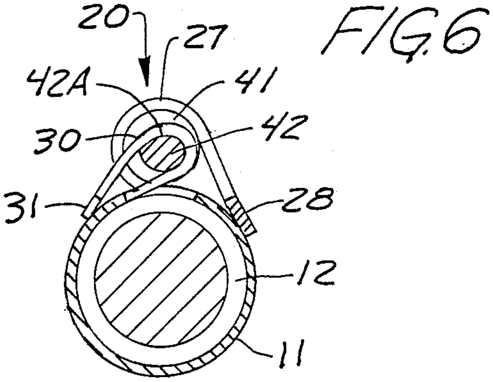
FIG. 6 is a sectional view taken as on line 6—6.
Figure 7:
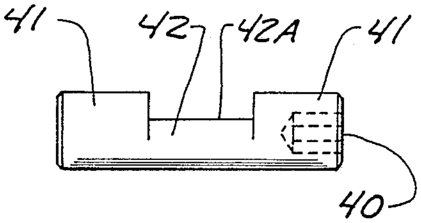
FIG. 7 is a side view of a cam used with the clamp of the present invention.

As can be seen in FIG. 5 in particular, the center cam web 30 fits around the cam portion upper surface 42A. As the cam pin 40 is rotated, the tightening or clamping effect is achieved by distance changes between the central axis of hubs 41 on the pin ends in the journals formed by straps 27 and the central axis of cam portion 42. The cam action tends to increase or decrease the width of slot 16 and thus the diameter of housing 11 to either loosen or tighten the housing with respect to the heater coil.

The clamp can be assembled onto the heater before the heater is slid into position in the recess 15A of the injection molding assembly, so that the clamp is easily used. The end socket indicated at 44 of the cam pin 40 is accessible easily from the open end of the blind hole or recess 15A that is shown in FIG. 1, so that a key such as that shown at 45 can be inserted and removed easily and the clamping adjustment can take place without having to operate in the blind hole.

The housing 11 is quite easily made and low cost, and fulfills the needed functions using few parts for clamping heaters for retaining them in heat conducting relationships to an injection molding nozzle.

The housing material can be made sufficiently thin to permit clamping and to insure that the cam web 30 forms of bends over the pin cam section 42, but yet strong enough to carry the necessary tightening loads for adjustment.

Although the present invention has been described with reference to preferred embodiments, workers skilled in the art will recognize that changes may be made in form and detail without departing from the spirit and scope of the invention.

What is claimed is:

1. A clamp comprising a housing member that is formed generally into a cylindrical shape and which has a longitudinal central axis; a slit extending along the longitudinal length of said housing member on one side thereof forming edges that are spaced apart, said edges comprising first and second edges which when moved together will reduce the diameter of the cylindrical housing; a rotatable cam member; cam mounting means mounted on a first of said edges for rotatably mounting the rotatable cam member, said rotatable cam member having a central axis and a cam portion which changes its effective portion relative to the central axis when the cam member is rotated; and cam follower means mounted on a second of said edges for engaging said cam portion whereby movement of said cam member about its central axis will cause the spacing between the first and second edges to change.

2. The clamp as specified in claim 1 wherein said cam mounting means comprises a pair of journals for rotatably mounting cylindrical hubs of said cam member at two axially spaced locations, and wherein said cam follower comprises a cam follower strap that fits between said journals, said cam member comprising a shaft having end hubs and a central cam portion engaging said cam follower strap.

3. The clamp of claim wherein said housing comprises a formed piece of metal, and wherein the cam mounting means and the cam follower means on the opposite spaced first and second edges, respectively are integrally formed with the housing and comprise integral straps that are folded over to form the respective journals and cam follower.

4. A clamp for securing a heater element to an injection molding barrel, said heater element comprising a helically wound heater having a generally cylindrical outer surface, and said clamp comprising a generally cylindrical housing having a central longitudinal axis, said housing being of size to surround said helically wound heater, a longitudinal slit formed in said housing defined by longitudinally extending edges that are spaced apart transversely, journal means formed on one of said edges, said journal means providing generally cylindrical journals that are spaced longitudinally, a cam follower formed on a second of said edges and positioned between said cylindrical journals, the cam follower comprising a loop, and a cam having cylindrical end hub portions mounted in said cylindrical journals for rotation about an axis generally parallel to the axis of said cylindrical housing, and having a central cam portion which is engaged by the cam follower loop and which changes the transverse spacing between the first and second edges as the cam is rotated.

5. The clamp as specified in claim 4 wherein said cylindrical journals comprise generally continuous straps integral with the first edge and looped over and fastened to the outer surface of said housing adjacent the first edge, and wherein said cam follower comprises a web integral with the second edge and formed in a loop to extend back to be fastened to the outer surface of said housing adjacent the second edge.

6. The clamp of claim 5 wherein said cam is a pin having equal size hubs at its ends and the cam portion is a reduced size portion between the hubs.

* * * * *

UNITED STATES PATENT AND TRADEMARK OFFICE
CERTIFICATE OF CORRECTION

PATENT NO. : 4,968,247

DATED : November 6, 1990

INVENTOR(S) : Charles W. Olson

It is certified that error appears in the above-identified patent and that said Letters Patent is hereby corrected as shown below:

Col. 4, line 5, delete "claim", insert --claim 1--.

Signed and Sealed this

Twenty-third Day of June, 1992

*Attest:*

DOUGLAS B. COMER

*Attesting Officer*

*Acting Commissioner of Patents and Trademarks*